Sept. 20, 1938.  L. E. GOLLNICK  2,130,795
DRIVE CONNECTION FOR MOWING MACHINES
Filed Dec. 31, 1936    3 Sheets-Sheet 1
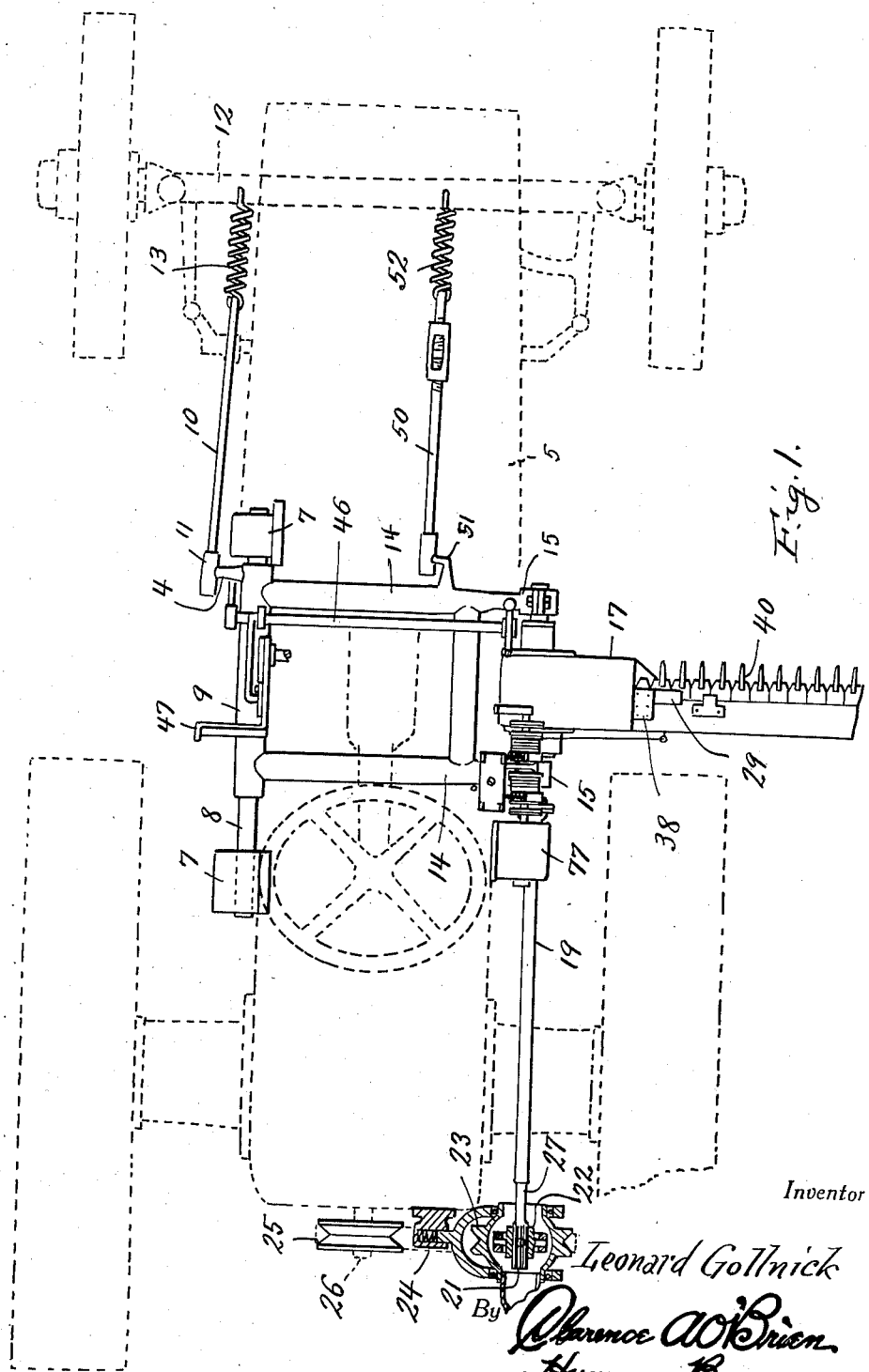
Inventor
Leonard Gollnick
By
Clarence A. O'Brien
Hyman Berman
Attorneys

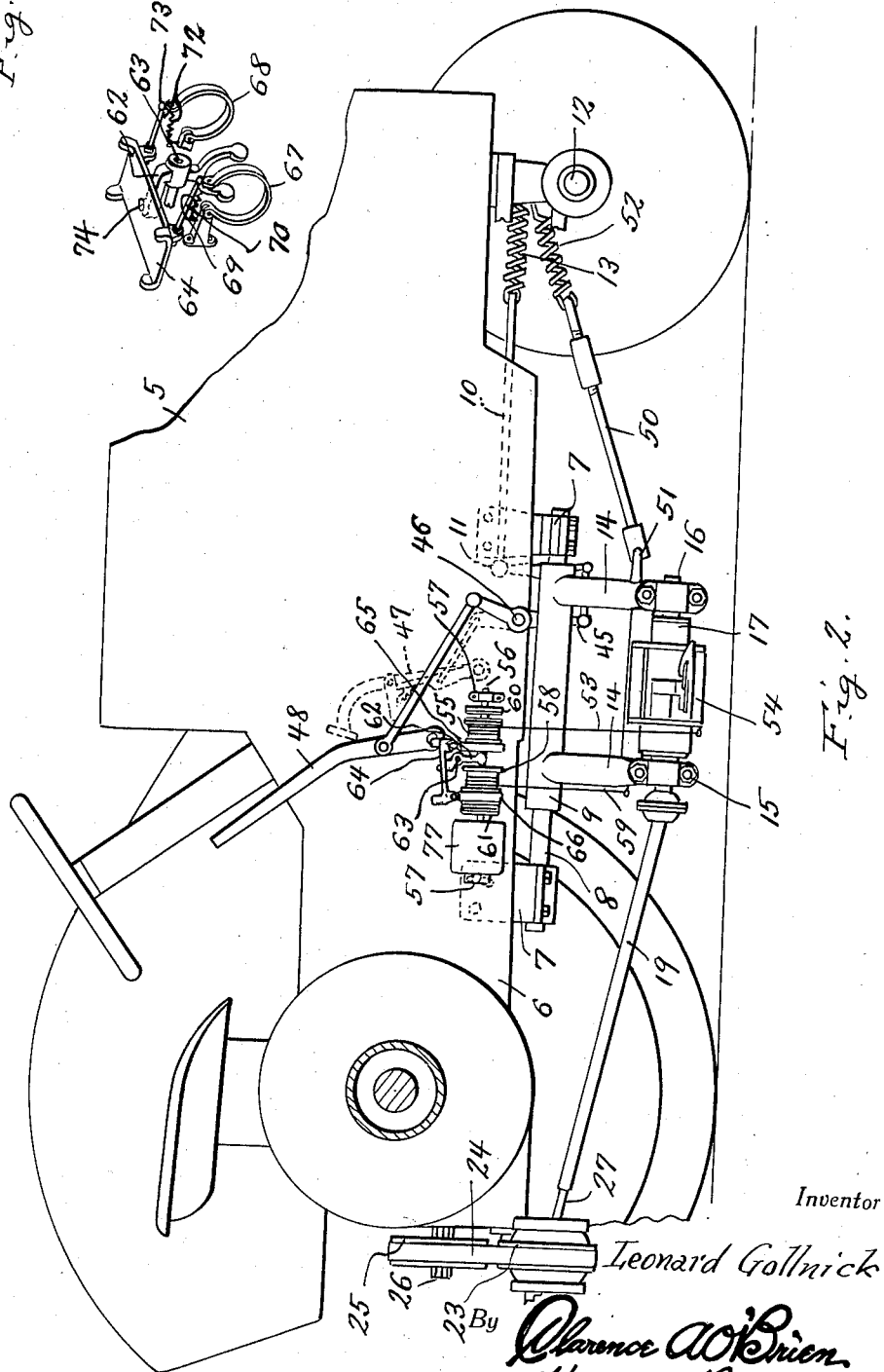

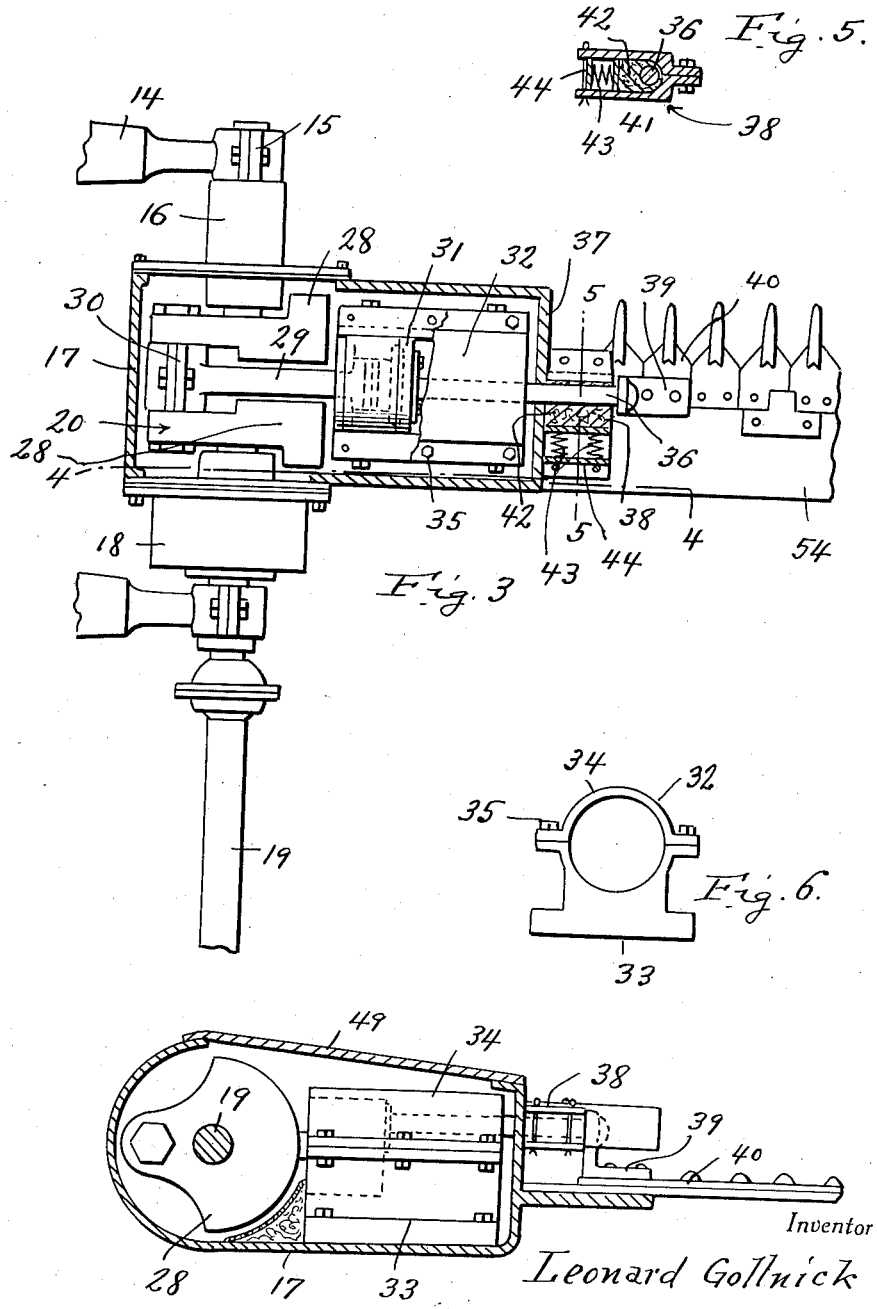

Patented Sept. 20, 1938

2,130,795

UNITED STATES PATENT OFFICE 2,130,795

DRIVE CONNECTION FOR MOWING MACHINES

Leonard E. Gollnick, Vero Beach, Fla.

Application December 31, 1936, Serial No. 118,665

14 Claims. (Cl. 56—25)

The present invention relates to mowing machines and has for its principal object to provide a tractor driven machine of this character embodying means for slidably mounting the mower to the tractor and operable, when the mower blade encounters an obstruction, to disengage the drive connection of the mower and also to release the clutch and apply the brakes of the tractor or one wheel thereof to cause a turning of the tractor in a direction toward the obstruction to relieve impact of the mower therewith.

Another object is to provide a drive connection between the rotating shaft and reciprocating bar of the machine which is capable of withstanding a much higher speed than is possible in the ordinary type of mowing machine and in which vibration and chattering is reduced to a minimum.

A further object is to provide a pitman drive connection between the rotating drive shaft and the reciprocating sickle bar in which all the moving parts are encased within an oil reservoir.

A still further object is to provide a device of this character of simple and practical construction, efficient and reliable in performance, relatively inexpensive to manufacture and maintain in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a top plan view of a tractor equipped with the mower.

Figure 2 is a side elevational view with parts shown in section.

Figure 3 is a sectional veiw through the housing for the pitman drive.

Figure 4 is a sectional view taken substantially on a line 4—4 of Figure 3.

Figure 5 is a sectional view taken on a line 5—5 of Figure 3, and

Figure 6 is an end elevational view of the sectional cylinder for the piston of the pitman drive connection.

Figure 7 is a perspective view of the brake control pedal for the mower raising and lowering drums.

Referring now to the drawings in detail, wherein for the purpose of illustration I have disclosed a preferred embodiment of the invention the numeral 5 designates a tractor to the underside at one side of the frame 6 of which is secured a pair of longitudinally spaced brackets 7 supporting the ends of a longitudinally extending horizontal rod 8 upon which is pivotally and slidably mounted a bearing sleeve 9. A rod 10 is attached to the forward end of the sleeve by a ball and socket connection 11, which includes a stub 4 and extends forwardly for attaching to the front axle 12 by an expansible coil spring 13 to yieldably urge the sleeve forwardly on the rod 8.

A pair of arms 14 extend in parallel relation laterally from one side of the sleeve transversely beneath the tractor to a relative opposite side, the ends of the arms having brackets 15 supporting trunnions 16 on the opposite sides of a housing 17 shown in detail in Figures 3 and 4. One trunnion 18 is hollow within which is journaled a shaft 19 one end of which extends into the housing for connection to a counterbalanced pitman 20, while the opposite end of the shaft extends rearwardly of the tractor as shown in Figures 1 and 2. The rear end of the shaft is splined as at 21 and slidably fitted in a hub 22 of a universal joint within the pulley 23 driven by a belt 24 from a pulley 25 on the drive shaft 26 of the tractor. Forwardly of the splined end 21 the shaft is reduced as at 27 whereby upon the rearward movement of the shaft the spline is disengaged and the drive connection between the tractor and the shaft 19 is interrupted.

The pitman indicated generally at 20 is formed of a pair of spaced apart counterbalanced members 28 journaled in bearings in the respective trunnions 16 and 18 and between the members 28 is positioned a piston rod 29 connected at one end to the said members by a bearing 30. The opposite end of the piston rod carries a piston 31 slidably positioned in an open ended cylinder 32. The cylinder is provided with a base 33 bolted to the bottom of the housing 17 and the bore of the cylinder is split longitudinally to provide an adjustable and removable section 34 secured to the base portion by bolts 35.

A rod 36 is attached at one end to the piston and extends through the wall 37 of the housing and packing 38 where its opposite end is attached to a perch 39 of a reciprocating sickle blade 40. The packing 38 comprises a U-shaped housing 41, see Figure 5, within which is slidably positioned an adjustable packing block 42 held against the rod 36 by springs 43 secured in the housing by a plate 44.

The post 4 of the ball and socket connection 11 also has a crank arm connection 45 with the transverse rod 46 of a combined clutch and brake control which includes a clutch operating pedal 47 and hand brake lever 48 whereby it will be apparent that upon the rearward sliding movement of the mower supporting arms 14 the rod 46 will be rocked to cause a disengagement of the clutch of the tractor and to apply the brake of the tractor. The brake lever 48 is preferably connected to a brake for the differential drive (not shown) of conventional construction at that side of the tractor from which the mower extends so that when the brake is applied, as by the contact of the mower with an obstruction, the application of the brake will cause a turning of the tractor toward that side to relieve the force of the contact with the obstruction.

The pitman housing 17 is designed to contain a quantity of lubricating oil and is provided with a cover plate 49 for filling purposes and for adjustment and removal of the pitman and associated parts for repairing the same.

A second forwardly extending rod 50, parallel to the rod 10 also has one end attached to the front arm 14 by a ball and socket connection 51 and its other end attached to the axle 12 by an expansible coil spring 52 to yieldably maintain the mower in its forward operating position.

The mower is swingably supported on the trunnions 16 and 18 for vertical raising and lowering movement by means of a cable 53 having one end thereof attached to the stationary cutter 54 and its opposite end wound about a drum 55 freely mounted on a shaft 56 journaled to the tractor by bearing brackets 57. A second drum 58 is also freely mounted on the shaft about which is wound a cable 59 having one end attached to one of the mower supporting arms 14 to swing the mower and supporting arms as a unit vertically on the rod 8.

The drums 55 and 58 are slidable on the shaft 56 and have one end frictionally engageable respectively with friction clutch members 60 and 61 keyed to the shaft, the drums being moved into and out of engagement with their respective clutch members during opposite sliding movement. The adjacent ends of the drums are connected for sliding actuation by the lower end of a foot lever 62 pivoted at 63 to the tractor and having a foot plate 64 pivoted to the upper end of the lever.

The drums are also provided with brake controls comprising brake drums 65 and 66 on the rear ends of the cable drums having split brake bands 67 and 68 associated respectively therewith. The free end of the band 67 has a spring 69 attached thereto at one end, the opposite end of the spring being connected to the frame of the tractor, and the brake band 68 has a similar spring 72 attached thereto at one end and its opposite end attached to the frame of the tractor. The foot plate 64 is pivoted at 74 to the foot lever 62 to provide for rotation of the foot plate. The springs normally maintain the bands in contracted or brake applying position, the brakes being released by the manipulation of the respective rods 70 and 73 loosely attached at one end to the foot plate and with their opposite ends attached to the respective bands 67 and 68.

An electric motor 77, having a suitable electrical connection with the battery of the tractor, drives the shaft 58 and it will be apparent the manipulation of the foot pedal will selectively move the respective drums into and out of operative position to adjust the position of the mower and its supporting arms.

While the mower is shown and described mounted upon a tractor it is to be understood the same is also capable of use upon other types of machines, such as harvesters and the like where a mower forms a part thereof.

It is believed the manner of operation of the machine as well as the details of construction will be readily understood from the foregoing without further detailed explanation.

Having thus described the invention what I claim is:

1. A mowing machine comprising in combination, a vehicle, a mower operatively mounted thereon and pivoted for vertical swinging movement, a motor driven shaft, a drum freely and slidably mounted thereon, a cable connecting the mower to the drum, a clutch member keyed to the shaft and engageable by the drum for actuation of the latter, brake means for the drum and foot pedal control means for moving the drum into and out of clutch engaging position and for applying and releasing the brake.

2. A mowing machine comprising in combination, a vehicle, a mower operatively mounted thereon and pivoted for vertical swinging movement, a motor driven shaft, a drum freely and slidably mounted thereon, a cable connecting the mower to the drum, a clutch member keyed to the shaft and engageable by the drum for actuation of the latter, brake means for the drum, a foot pedal for slidably actuating the drum into and out of clutch engaging position and brake control means carried by the pedal and operable for applying and releasing said brake.

3. A mowing machine comprising in combination, a vehicle, a mower support pivoted thereto for vertical swinging movement, a mower operatively carried by the support and pivoted thereto for independent vertical swinging movement, a motor driven shaft, a pair of drums freely and slidably mounted thereon, cables respectively connecting said drums to the support and the mower, clutch members for each of the drums keyed to the shaft and engageable by the drums during opposite sliding movement, brake means for each of the drums and foot pedal control means for moving the drums into and out of clutch engaging position and for selectively applying and releasing the respective brakes.

4. A mowing machine comprising in combination, a vehicle having brake means for one wheel, a mower, means slidably supporting the mower on the vehicle, said mower being adapted for slidable actuation on its support upon contact with an obstruction in the path of the mower whereby to move the mower bodily relative to the vehicle and means connecting the mower and the brake to apply the brake upon said bodily movement of the mower.

5. A mowing machine comprising in combination, a vehicle embodying power drive means and brake means for one wheel, said power drive means including a clutch, a mower, means slidably supporting the mower on the vehicle, said mower being adapted for slidable actuation on its support upon contact with an obstruction in the path of the mower whereby to move the mower bodily relative to the vehicle and means connecting the mower with the brake and clutch to apply the brake and disengage the clutch upon said bodily movement of the mower.

6. A mowing machine comprising in combination, a power driven vehicle embodying a clutch, brake means for one wheel and a power take-off, a mower, means slidably supporting the mower on the vehicle, said mower being adapted for slidable actuation on its support upon contact with an obstruction in the path of the mower whereby to move the mower bodily relative to the vehicle, means connecting the mower with the brake and clutch for simultaneously applying the brake and disengaging the clutch upon said bodily movement of the mower and means operatively connecting the mower to the power take-off and responsive to said bodily movement of the mower to disengage the same from the power take-off.

7. A mowing machine comprising in combination, a power driven vehicle including a power take-off, a mower, means slidably supporting the mower on the vehicle, said mower being adapted for slidable actuation on its support upon contact with an obstruction in the path of the mower whereby to move the mower bodily relative to the vehicle, drive means operatively connecting the mower with the power take-off and an automatic drive connection for said drive means operable to interrupt the drive means upon the sliding movement of the mower.

8. A mowing machine comprising in combination, a power driven vehicle including a power take-off, a mower, means slidably supporting the mower on the vehicle, said mower being adapted for slidable actuation on its support upon contact with an obstruction in the path of the mower whereby to move the mower bodily relative to the vehicle, drive means operatively connecting the mower with the power take-off, an automatic drive connection for said drive means operable to interrupt the drive means upon the sliding movement of the mower and spring means yieldably maintaining the mower against sliding movement.

9. A mowing machine comprising in combination, a power driven vehicle including a brake for one wheel and a clutch, a mower, means slidably supporting the mower on the vehicle, said mower being adapted for slidable actuation on its support upon contact with an obstruction in the path of the mower whereby to move the mower bodily relative to the vehicle and an operating connection between the brake and the clutch and adapted to apply the former and disengage the latter upon such bodily movement of the mower.

10. A mowing machine comprising in combination, a power driven vehicle including a brake for one wheel and a clutch, a mower, means slidably supporting the mower on the vehicle, said mower being adapted for slidable actuation on its support upon contact with an obstruction in the path of the mower whereby to move the mower bodily relative to the vehicle, an operating connection between the brake and the clutch and adapted to apply the former and disengage the latter upon such bodily movement of the mower and spring means yieldably maintaining the mower in normal operating position.

11. A mowing machine comprising in combination, a power driven vehicle including a brake for one wheel, a clutch and a power take-off, a mower, means slidably supporting the mower on the vehicle, said mower being adapted for slidable actuation on its support upon contact with an obstruction in the path of the mower whereby to move the mower bodily relative to the vehicle, a slidable drive connection between the mower and the power take-off and adapted to disengage the power take-off upon said bodily movement of the mower in one direction and an operating connection between the mower with the brake and clutch to apply the former and disengage the latter upon such bodily movement.

12. A mowing machine comprising in combination, a power driven vehicle including a brake for one wheel, a clutch and a power take-off, a mower, means slidably supporting the mower on the vehicle, said mower being adapted for slidable actuation on its support upon contact with an obstruction in the path of the mower whereby to move the mower bodily relative to the vehicle, a slidable drive connection between the mower and the power take-off and adapted to disengage the power take-off upon said bodily movement of the mower in one direction, an operating connection between the mower and the brake and clutch to apply the former and disengage the latter upon such bodily movement and spring means yieldably maintaining the mower in an opposite direction.

13. A mowing machine comprising in combination, a vehicle, a mower supporting frame, means pivotally and slidably supporting one end of the frame on the vehicle, a mower carried at the free end of the frame and adapted for slidably actuating the frame upon contact with an obstruction in the path of the mower whereby to move the mower bodily relative to the vehicle, drive means for the mower and an automatic drive connection for the drive means adapted to interrupt the latter upon said bodily movement of the mower.

14. A mowing machine comprising in combination, a vehicle, a mower supporting frame, means pivotally and slidably supporting one end of the frame on the vehicle, a mower carried at the free end of the frame and adapted for slidably actuating the frame upon contact with an obstruction in the path of the mower whereby to move the mower bodily relative to the vehicle, a driven shaft operatively connected at one end to the mower for bodily movement therewith, a power driven pulley and a slidable splined connection between the other end of the shaft and the pulley for normally operating the shaft and adapted for disengaging the shaft from the pulley upon said bodily movement of the mower.

LEONARD E. GOLLNICK.